United States Patent [19]

Pettet

[11] E Re. 28,660

[45] Reissued Dec. 23, 1975

[54] DISCRIMINATING APPARATUS FOR MOVING TRANSLUCENT SHEETS

[75] Inventor: Ronald Sidney Pettet, Portsmouth, England

[73] Assignee: De La Rue Instruments Limited, London, England

[22] Filed: Sept. 17, 1973

[21] Appl. No.: 397,622

Related U.S. Patent Documents

Reissue of:

[64] Patent No.: 3,731,916
Issued: May 8, 1973
Appl. No.: 148,744
Filed: June 1, 1971

[30] Foreign Application Priority Data

June 4, 1970 United Kingdom ..... 26,940/70

[52] U.S. Cl. ..... 271/263; 250/559; 250/560; 271/64

[51] Int. Cl.[2] ..... B65H 7/14

[58] Field of Search ..... 271/263, 262, 258, 64; 209/111.7; 250/559, 560, 360; 93/93 C

[56] References Cited

UNITED STATES PATENTS

| | | | |
|---|---|---|---|
| 3,186,708 | 6/1965 | Hinz | 271/263 |
| 3,520,404 | 7/1970 | Pine | 209/111.7 |
| 3,525,433 | 8/1970 | Babb | 209/111.7 |
| 3,578,315 | 5/1971 | Milford | 271/263 |
| 3,611,887 | 10/1971 | Shibanuma | 93/93 C |

*Primary Examiner*—Evon C. Blunk
*Assistant Examiner*—Bruce H. Stoner, Jr.
*Attorney, Agent, or Firm*—Baldwin, Wight & Brown

[57] ABSTRACT

Apparatus for discriminating between moving translucent sheets comprising a sheet transportation means adapted to convey the sheets in spaced relationship along a flow-line, a photoelectric detection device sited on one side of the flow-line, a first differential amplifier having an input in circuit with the said detection device and adapted to produce a first output signal every time the photoelectric device detects attenuation of the light source in excess of a first predetermined value, and a second differential amplifier having an input also in circuit with the said detection device and adapted to produce a second output signal every time the photelectric device detects attenuation of the light source in excess of a second different predetermined value.

17 Claims, 5 Drawing Figures

Inventor:
Ronald Sydney Pettet
By Baldwin Wight & Brown
Attorneys

Inventor:
Ronald Sydney Pettit
BY Baldwin Wight & Brown
Attorneys

DISCRIMINATING APPARATUS FOR MOVING TRANSLUCENT SHEETS

Matter enclosed in heavy brackets [ ] appears in the original patent but forms no part of this reissue specification; matter printed in italics indicates the additions made by reissue.

This invention relates to apparatus adapted to discriminate between lengths and thickness of translucent sheet material travelling along a flow-line at high speed and optionally to count some or all of such sheets. More especially, the invention relates to such apparatus which includes a photoelectric detection means and an associated light source disposed on opposite sides of the flow-line in such a manner that the photoelectric means is subjected to variations of light intensity during the passage of the sheets.

BACKGROUND OF THE INVENTION

In many sheet feeding machines, for example, in the case of machines adapted to feed and count treasury notes, it is essential that an exact count is recorded of the number of pieces actually delivered. To this end it is usual to provide means which ensure that multiple or superposed notes are not counted as a single unit.

A known method of achieving the above requirement is to feed the notes through a critical gauging throat which may be arranged to hold back superposed notes, or to stop the machine when sheets of abnormal thickness are present, or more preferably to actuate a divertor means which serves to remove multiple notes from the flow-line before they are fed to a counting and delivery stage. An example of the latter arrangement is described in our British Pat. No. 898,715 in which the gauging throat comprises a nip of a critical dimension formed between a pair of driven gauging rollers. It is so arranged that normal thickness notes pass through the nip, but multiple or excess thickness notes cause a displacement of the axis center of one of the rollers which brings into effect a solenoid actuated divertor. Counting is carried out by means of an electrical make-and-break circuit disposed downstream of the divertor which advances a digital counter in an incremental manner. Such an arrangement possesses a finite operating speed because of the mechanical inertia of the detection means and, furthermore, because of the difficulties in differentiating between relatively small differences of thickness at high speed, considerable constructional problems are created. It has been found in practice that the gauging nip must be adjusted within fine limits to promote the desired sensitivity to abnormal thickness and furthermore mechanical wear of certain critical components necessitates careful maintenance to retain the desired degree of reliability.

SUMMARY OF THE INVENTION

It is one object of the present invention to provide apparatus for discriminating between sheets of the above-described kinds without the need for a precise mechanical gauging throat.

According to the present invention apparatus for discriminating between moving translucent sheets comprise a sheet transportation means adapted to convey the sheets in spaced relationship along a flow-line, a photoelectric detection device sited on one side of the flow-line and an associated light source sited on the other side of the flow-line, a first differential amplifier having an input in circuit with the said detection device and adapted to produce a first output signal every time the photoelectric device detects attenuation of the light source in excess of a first predetermined value, and a second differential amplifier having an input also in circuit with the said detection device and adapted to produce a second output signal every time the photoelectric device detects attenuation of the light source in excess of a second different predetermined value. Thus in one embodiment of the invention apparatus for handling sheets of a like-kind may be so adapted that the output of the said first differential amplifier controls a first digital counting circuit to record the total quantity of single sheets or groups of "adhered-together" sheets fed along the flow-line, and that the output of the said second differential amplifier controls a second digital counting circuit to record solely the number of groups of "adhered-together" sheets.

Preferably the apparatus also includes a sheet divertor means disposed downstream of the said detection device and under the control of the said second differential amplifier, the arrangement being such that the divertor, which is normally inoperative, is moved to an operative position every time the said second output signal is created. In a specific embodiment it may be arranged for a count pulse to be inhibited from the said first counting circuit every time the divertor is moved to the operative position thereby to record only the passage of single sheets.

Preferably the apparatus also includes a pulse-counter unit fed from a pulse generator via a gate under the control of the output of the first differential amplifier, said unit being capable of ascertaining the length of a sheet or the overall length of overlapping sheets in the direction of the flow-line thereby, in conjunction with the output of the second differential amplifier, to detect the presence of superposed, partially overlapping or edge-abutting sheets.

Preferably the said pulse generator is driven in unison with the linear travel of the sheets in the flowline. In a convenient form the pulse generator comprises a circumferentially perforated or notched wheel member positively driven by the drive mechanism of the said sheet transportation means, and adapted to influence a transducer which may be of the optical or magnetic kind.

One embodiment of the invention will now be described with reference to the accompanying drawings of which:

Figure 1:
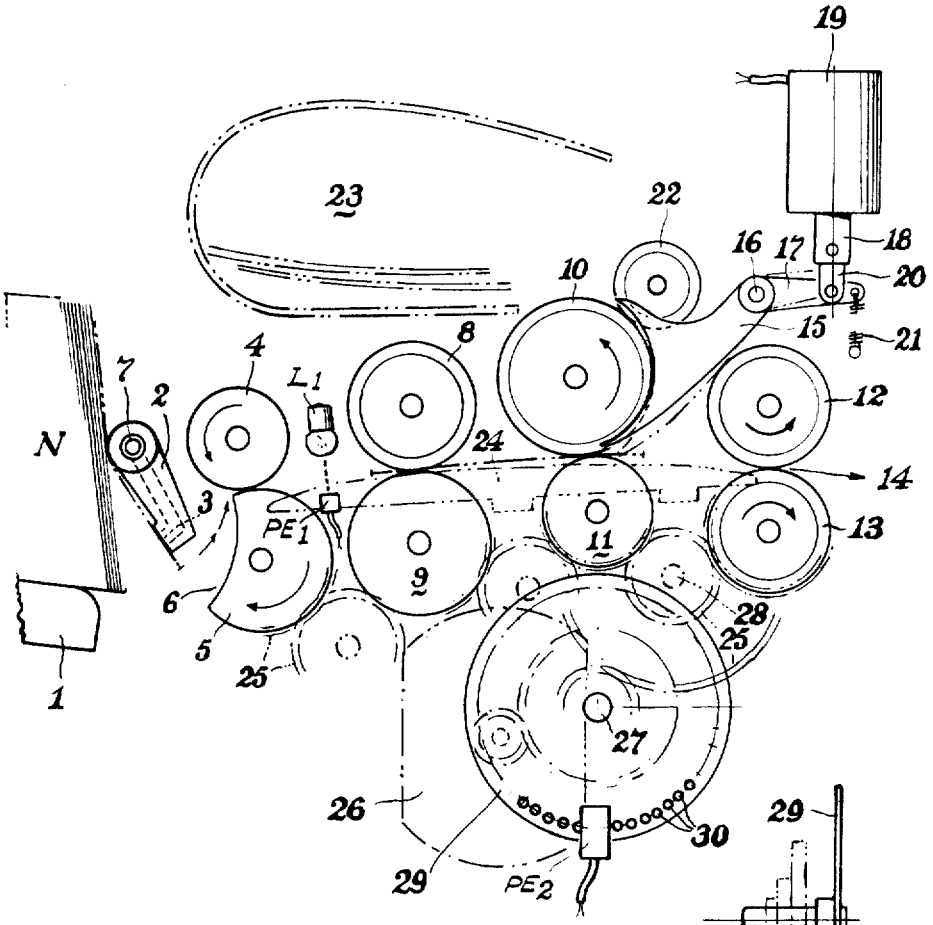
FIG. 1 is a side elevation of a banknote feeding and transportation mechanism showing the basic parts thereof.

In FIG. 1, the banknote feeding, transporting and deflecting mechanisms are substantially similar to those disclosed in our British Pat. No. 898,715 and comprise essentially an inclined stack support member 1 adapted to support a stack of banknotes N on edge. The notes are biassed (by means not shown) towards an oscillatory suction arm 2 provided with an angled suction port 3 which contacts the lower central face of the frontmost note in the stack and feeds it into the nip of a pair of primary feed rollers 4 and 5. The lower roller 5 is provided with a cut-away portion 6 to facilitate entry of the leading side edge of the note. The arm is oscillated by means of a tubular shaft member 7 which is adapted to be moved in a bi-rotational manner by a cam system driven in unison with the primary feed rollers 4 and 5; the interior of the shaft 7 is in communication with a source of suction (not shown). When the circumferential surfaces of the feed rollers co-act, the note is pulled from the face of the suction port 3, and is passed between a light 'L1' and an associated photoelectric detector 'PE1', and thence into the nips of three pairs of conveying rollers 8,9; 10,11; and 12,13 respectively. The nips of the primary and conveying rollers collectively define a substantially linear flow-line for the notes which terminates at the arrow 14; delivery means beyond the arrow form no part of the present invention.

A note divertor means provided between the conveying rollers 10,11 and 12, 13 comprises a plurality of spaced fork members 15 rigidly attached to a shaft 16 which also includes an actuating lever 17 connected to the slidable armature 18 of a solenoid 19 by means of a connecting link 20. The divertor assembly is biassed to an inoperative position, as shown by means of a tension spring 21. An auxiliary rubber-surfaced driven roller 22 is provided above the upper conveying roller 10, and a "reject" note hopper 23 is provided above the rollers 4 and 8 to receive diverted notes. Energization of solenoid 19 causes the divertor assembly to move to the position indicated by the chain-dotted line, whereupon the tips of the fork members 15 descend into the flow-line thereby to cause a note or notes to be propelled around 180° of the circumference of the roller 10 and thence into the hopper 23.

To facilitate the passage of notes through the roller system a series of parallel guide members, one of which is indicated by symbol 24, are provided below the flow-line.

Figure 1A:
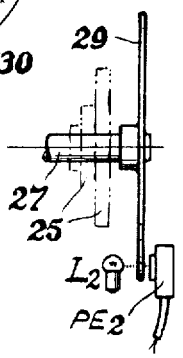
FIG. 1a is a fragmentary end view of some of the parts of the mechanism of FIG. 1.

The entire roller system is driven at a constant peripheral speed through a gear train generally indicated at 25, by an electric motor 26 via a two-stage gear reduction disposed on secondary shafts 27 and 28. The shaft 27 (see also FIG. 1a) mounts a fixedly attached disc member 29 which is provided with an equally pitched circumferential row of holes 30. A light source 'L2' and an assocated photoelectric detector 'PE2' are disposed in alignment with the holes 30 on the opposite sides of the disc.

Figure 2:
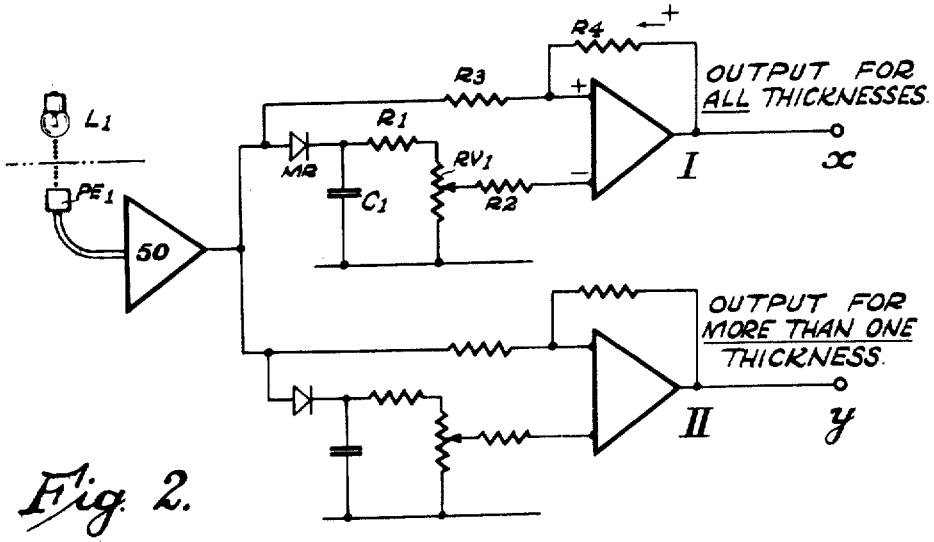
FIG. 2 is a diagram of part of an electrical circuit for performing the optically discriminating aspect of the invention; [ and ]
Figure 3:
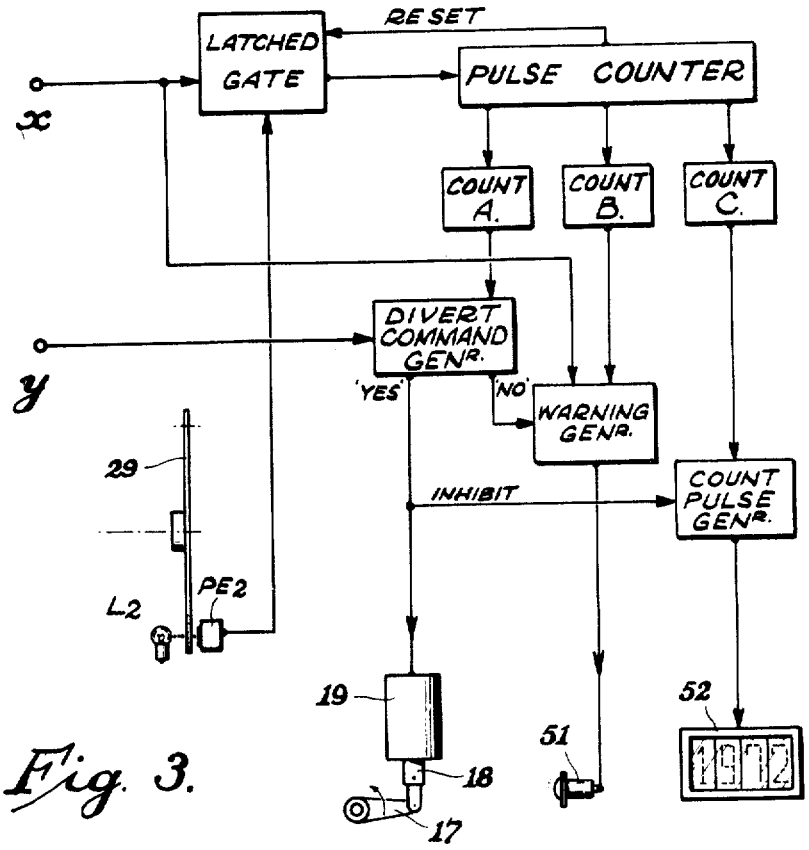
FIG. 3 is a schematic block plan showing the interconnection of various electronic assemblies useful in the performance of the invention [ . ] *; and*

The electronic circuitry of the apparatus will now be described with reference to FIGS. 2 and 3. It should be noted that the two outputs x and y of FIG. 2 are connected respectively to the left-hand side of FIG. 3.

The output of the photoelectric detector PE1 is fed into a linear amplifier 50 the output of which feeds into two substantially similar networks, and thence through respective differential amplifiers to points x and y. The assembly I serves to provide an output signal at x for each single note or group of partially or wholly superposed notes that pass between L1 and PE1, and the assembly II (which is of course pre-set in a different manner), serves to provide an output signal at y for each multiple thickness note or notes, or each single note having an abnormally high opacity that passes between L1 and PE1.

The output of the linear amplifier 50 passes through a rectifier MR which, with a capacitor C1, forms a peak level detection means. When no note is interposed between L1 and PE1 the linear amplifier produces a peak output proportional to the intensity of the light falling on the photoelectric detector PE1. The rectifier MR permits only the positive peak to charge the capacitor C1 and effectively prevents reverse flow of current from C1 when the light falling upon PE1 is attenuated by the presence of a note.

An R/C network comprising C1, R1, RV1 and R2 provides a time-constant sufficiently long to prevent any significant discharge of C1 during the period when light is attenuated. The arrangement is self-compensating insofar that a gradual fall-off of light output created by the ageing effect of the light source, a deterioration in the sensitivity of the photoelectric detector or a reduction of gain of the linear amplifier, is compensated for automatically because the charge of C1 will also reduce at the same rate.

Having charged the peak level detection means up to the voltage produced by the unattenuated light source, a proportion of it is coupled to the "inverting" input of the differential amplifier via the slider of the potentiometer RV1. The potentiometer thus provides a presetting means for adjusting the sensitivity of the assembly. The full output of the linear amplifier, taken from a point upstream of the rectifier MR, is connected to the positive "non-inverting" input of the differential amplifier. Hence, when the light falling upon the photoelectric detector is unattenuated the voltage to the "non-inverting" input provides positive feed-back so that the output x of the differential amplifier will be a maximum positive. Conversely, when the light level is attenuated, the output of the linear amplifier will fall to below the level set on the "inverting" input with the result that the differential input will be "inverted" thereby to produce a negative output x from the differential amplifier. A positive feed-back loop comprising the resistor R4 ensures that the output x will be a maximum negative.

The assembly II, which terminates at an output y, is substantially similar to that described above and serves to produce an output pulse of changed polarity when the light is attenuated to a greater degree, for example on the passage of a plurality of adhered-together notes.

The means for discriminating between the length of a single sheet and the overall length of superposed sheets, as measured in the direction of the flow-line, will now be described.

Operation of the roller system of the machine also causes, through the medium of the gearing system, the perforated disc member 29 to rotate, with the result that a succession of electrical pulses is created in the photoelectric detector PE2. These pulses are fed into a "Pulse Counter" via a "Latched Gate" (see FIG. 3) which is opened at the commencement of every period of attenuation of PE1, via the electronic assembly 1 and closed after a preset number of pulses have been fed into the "Pulse Counter". The number of pulses fed into the "Pulse Counter" is directly proportional to the angular displacement of the shafts in the drive mechanism, and hence to the length of the sheet being fed.

The "Pulse Counter" provides outputs in accordance with three different preset and ascending numbers of datum counts which permit decisions to be effected in accordance with the overall length of a sheet or sheets passing through the optical system. These counts are routed in the following manner:

COUNT A into a "Divert Command Generator" which also receives signals from the electronic assembly II via connection y. The "Divert Command Generator" is provided with two alternative outputs viz, a 'YES' output to the divertor solenoid 19 and a "Count Pulse Generator", or a 'NO' output to a "Warning Generator".

If signals from connections y are received before COUNT A is reached, the 'YES' output is obtained, the divertor solenoid 19 is actuated and an INHIBIT signal is fed to the COUNT PULSE GENERATOR. If COUNT A is exceeded before signals are received from the connection y, the 'NO' output is energized and the "WARNING GENERATOR" is energized.

COUNT B into the "Warning Generator" (which also receives signals from the x connection during the entire period of the attenuation of the light of L1) and thence to a warning device shown diagrammatically at symbol 51.

COUNT C into the "Count Pulse Generator" (which, as mentioned above, also receives INHIBIT signals when the divertor is actuated) and thence into a digital counter and display unit shown diagrammatically at symbol 52. In addition a RE-SET pulse is fed back to unlatch the LATCHED GATE upon attainment of COUNT C.

Actuation of the Apparatus, including examples of correct and incorrect note feeding.

Energization of the driving motor 26 will cause banknotes to be fed sequentially from the front of the stack N into the roller system along the flow-line thereby to attenuate in an intermittent manner the light falling upon the photoelectric detector PE1. Pulses will also be generated by the photoelectric detector PE2 through rotation of the disc member 29.

Case 1

The passage of a normal length single note will record a counting pulse in the counter unit 52 in the following manner:

When the leading edge of the note attenuates the light source a signal from the "all-thickness" assembly I opens the Gate which allows pulses from PE2 to pass into the "Pulse Counter". For a note of normal length, the light attenuation signal from x into the "WARNING GENERATOR" terminates before COUNT B is reached and thus no warning is generated. When the "Pulse Counter" reaches "COUNT C" a count pulse is generated and a count of 'one' is registered in the counter unit 52.

Case 2

The passage of two superposed or substantially superposed notes will be rejected in the following manner:

In a manner similar to that described in (1) above, the "Gate" passes pulses to the "Pulse Counter" but in this case, a multiple-thickness pulse is generated by the assembly II through the connection y and "Divert Command Generator". If the y signal, which is indicative of the commencement of the multiple thickness during the passage of the sheets, is created before 'COUNT A' is reached the sheets are capable of diversion and accordingly the "Divert Command Generator" generates a YES signal and energizes the solenoid 19 of the divertor thereby to cause the superposed notes to be conveyed into the reject note hopper 23. At the same time the count pulse at "COUNT C" is inhibited and no count is recorded in the counter unit 52. If signal y is created after 'COUNT A' is reached, diversion is not possible and the superposed or substantially superposed sheets are treated as partially overlapping sheets (see Case 3 below).

Case 3

The passage of two partially-overlapping notes will be handled in the following manner:

The cycle of operation is initiated as in Case 2 above but in this case "COUNT A" is reached before the creation of the y signal and the "Divert Command Generator" does not energize the solenoid 19 of the divertor. This prevents the mechanism from attempting to divert a note, the leading edge of which has already passed below the tips of the divertor fork members 15. Instead, a NO signal is applied to the "Warning Generator" which give a warning signal and the count pulse is not inhibited.

Case 4

The passage of two edge-abutting notes (viz. with no overlap) is handled as follows:

The cycle of operation is initiated as in Case 3 above, but in this case no multiple-thickness is detected. However, when "COUNT B" is reached the output of the "all-thickness" assembly I at connection x into the WARNING GENERATOR is still maintained thus indicating the presence of an abnormally long article. The "Warning Generator" initiates a warning and the "Count Pulse Generator" is activated as in Case 3.

It will be appreciated that the above described apparatus is capable of counting and discriminating translucent sheets at a very high speed, the upper limit of which is dependent only upon the mechanical limitations of the feeding mechanism. Furthermore, the photoelectric detection means and associated circuitry is self-compensating and thus after an initial setting-up, is capable of operating for long periods without attention.

It will further be appreciated that the complete elimination of the need for a critical gauging throat to detect multiple-thicknesses has simplified the mechanical construction of machines of this general type and avoided the need for frequent adjustment and maintenance.

Figure 4:
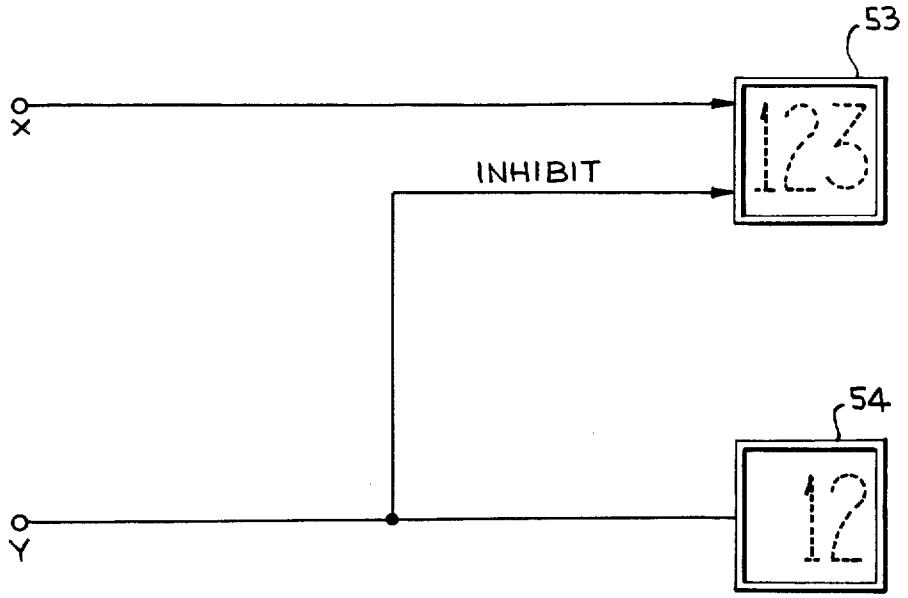
*FIG. 4 is another block plan showing the interconnection of digital counters operative by the electrical circuit of FIG. 2.*

*Reference is now made to FIG. 4 wherein a counter circuitry is shown including a first digital counter 53 and a second digital counter 54. y signals pass into the second digital counter 54 to advance the same one increment for each production of a y signal. x signals pass through the first digital counter 53 to normally advance the same one increment for each production of an x signal. However, the circuitry includes means for producing an INHIBIT signal upon each generation of a y signal to prevent the first digital counter 53 for advancing an increment when both x and y signals are generated.*

What we claim is:

1. Apparatus for discriminating between moving translucent sheets comprising a sheet transportation means for conveying the sheets in spaced relationship along a flow-line, a single photoelectric detection device positioned on one side of the flow-line and an associated light source positioned on the other side of the flow-line, a first differential amplifier means for producing a first output signal every time the photoelectric detection device detects attenuation of the light source in excess of a first predetermined value and having an input in circuit with the said detection device, and a second differential amplifier means for producing a second output signal every time the photoelectric detection device detects attenuation of the light source in excess of a second different predetermined value greater than said first predetermined value and having an input also in circuit with the said detection device *and means for receiving and utilizing said output signals to discriminate between sheets which produce solely said first output signal and sheets which produce both said first and second output signals.*

2. Apparatus as claimed in claim 1 in which the first output signal serves to indicate the passage of (a) each single sheet having an opacity greater than the first predetermined value and less than the second predetermined value; (b) each folded single such sheet; (c) each single sheet having an opacity greater than the second predetermined value; and (d) each group of partially or wholly superposed single sheets having an opacity greater than the second predetermined value, and the second output signal serves to indicate the passage of any sheet in category (b), (c) or (d).

[ 3. Apparatus as claimed in claim 1 together with means for coupling the first output signal to a first digital counter for actuating the same and means for coupling the second output signal to a second digital counter for actuating the same.]

[4. Apparatus as claimed in claim 3 together with means for inhibiting the first output signal to the first digital counter upon the production of the second output signal.]

5. Apparatus as claimed in claim 1 in which *said means for receiving and utilizing said output signals includes* a sheet divertor [is] provided in the flow-line at a point downstream of the photoelectric detection device, said divertor being normally inoperative with respect to the sheets, but being operable to move into the flow-line every time the said second output signal is produced.

6. Apparatus as claimed in claim 5 *in* which *said means for receiving and utilizing said output signals* [ additionally] includes length discrimination means for inhibiting actuation of the sheet divertor if the length of a sheet, or the overall length of a group of partially or wholly superposed sheets in the direction along the flow-line, exceeds a predetermined dimension.

7. Apparatus as claimed in claim [6 in ] *1* which [ the said ] *said means for receiving and utilizing said output signals includes a digital counter and* length [ discrimination ] *discriminator* means [comprises ] *including* [a pulse generator driven in unison with the sheet transportation ] *pulse-generating* means, a pulse-counting means [,] *and* gate-switching means [for directing ] *arranged to be opened by said first output signal and to direct* a train of pulses *from the pulse generator* to the pulse-counting means [whilst a sheet is present between the light source and the photoelectric detection device, and a count-discriminator for activating the sheet divertor only if less than a predetermined number of pulses are directed into]; the pulse-counting means *being operable to produce successively a first sheet-length-indicative datum count, a second sheet-length-indicative datum count and a digital count pulse for advancing said digital counter by one increment.*

8. Apparatus as claimed in claim 7 in which the said pulse generator comprises a circumferentially perforated wheel positively driven by the sheet transportation means, a second light source disposed on one side of the wheel in alignment with the said perforations, a second photoelectric-detection means disposed on the other side of the wheel in alignment with the said perforations and operable upon rotation of the wheel to feed a train of pulses into the said gate-switching means.

9. Apparatus as claimed in claim [5] *7* so constructed that the [creation ] *termination* of said first output signal [, and the termination thereof] before the attainment of the second datum count [and the creation of the said second output signal before the attainment of the first datum count ] indicates the passage of *one or more sheets having an over-all length within a predetermined range of lengths* [ plurality of overlapping sheets and further adapted to cause said divertor to move into the flow-line upon the passage of such sheets].

10. Apparatus as claimed in claim [5] *7* so constructed that the [creation ] *termination* of [ the ] said first output signal [and the termination thereof ] after the attainment of the second datum count [and the creation of the second output signal after the attainment of the first datum count ] indicates the passage of [ a plurality of overlapping sheets, and further adapted to inhibit the movement of said divertor into the flow-line and to actuate a warning means ] *one or more sheets having an overall length in excess of a predetermined length.*

11. Apparatus as claimed in claim 1 in which each differential amplifier means is provided with manually adjustable means adapted to permit the initial setting up of its output level.

12. Apparatus as claimed in claim 11 in which said input to said differential amplifier means includes one input dependent upon the effect of attenuated light upon said photo-electric device and a second input dependent upon the effect of direct light upon said photoelectric device, said second input including said adjustable means.

[13. Apparatus as claimed in claim 1 which additionally includes length discriminator means including a pulse generator driven in unison with the sheet transportation means, a pulse-counting means, gate switching means for directing a train of pulses to the pulse-counting means during production of said first output signal, the pulse counter being operable to produce successive first and second sheet length-indicative datum counts.]

[14. Apparatus as claimed in claim 13 so constructed that the creation of the first output signal and the termination thereof after the attainment of the first datum count, but before the attainment of the second datum count, indicates the passage of a sheet of predetermined opacity and length.]

[15. Apparatus as claimed in claim 13 so constructed that the creation of the first output signal and the termination thereof after the attainment of the second datum count indicates the passage of at least one sheet having an overall length in excess of a predetermined length.]

[16. Apparatus as claimed in claim 15 including warning means operable upon the passage of one or more sheets having an overall length in excess of a predetermined length.]

[17. Apparatus as claimed in claim 13 in which the said pulse generator comprises a circumferentially perforated wheel positively driven by the sheet transportation means, a light source disposed on one side of the wheel in alignment with the said perforations, a photoelectric detection means disposed on the other side of the wheel in alignment with the said perforations and adapted upon rotation of the wheel to feed a train of pulses into the said gate-switching means.]

*18. Apparatus as claimed in claim 9 which additionally includes a sheet divertor in the flow-line downstream of the photo-electric detection device, said divertor being normally inoperative with respect to the sheets but being available to move into the flow-line everytime the second output signal is produced, and a count-pulse inhibit switch means operable in unison with every said divertor movement to prevent said digital count pulse from advancing said digital counter by one increment.*

*19. Apparatus as claimed in claim 10 additionally including a warning means operable on the passage of one or more sheets having an overall length in excess of the predetermined length.*

*20. Apparatus as claimed in claim 19 additionally including a sheet divertor in the flow-line downstream of the photoelectric detection device, said divertor being normally inoperative with respect to the sheets but being operable to move into the flow-line upon the production of the second output signal as a consequence of the passage of a sheet or sheets having an overall length within a predetermined range of lengths*

*21. Apparatus as claimed in claim 20 additionally including a count-pulse inhibit means operable in unison with every said divertor movement to prevent said digital count pulse from advancing said digital counter by one increment.*

*22. Apparatus as claimed in claim 21 additionally including means operable to maintain said divertor in its normal inoperative position upon the production of the second output signal as a consequence of the passage of one or more sheets having an overall length greater than any length within a predetermined range of lengths.*

*23. Apparatus as claimed in claim 1 wherein said means for receiving and utilizing said output signals includes a first digital counter coupled to said first differential amplifier means for receiving said first output signal therefrom and to be actuated thereby, and a second digital counter coupled to said second differential amplifier means for receiving said second output signal therefrom and to be actuated thereby.*

*24. Apparatus as claimed in claim 23 wherein said first digital counter is coupled to said second differential amplifier means for inhibiting a first output signal to said first digital counter upon the production of a second output signal.*

* * * * *